(12) United States Patent
Cato

(10) Patent No.: US 6,816,608 B2
(45) Date of Patent: Nov. 9, 2004

(54) STORING INFORMATION RECORDED AS PART OF A FINANCIAL TRANSACTION WITH A QUANTITY OF DATA STORED DETERMINED BY A MONETARY VALUE OF THE TRANSACTION

(75) Inventor: Robert Thomas Cato, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 09/899,392

(22) Filed: Jul. 5, 2001

(65) Prior Publication Data

US 2003/0007676 A1 Jan. 9, 2003

(51) Int. Cl.[7] .................................................. G06K 9/00
(52) U.S. Cl. ...................... 382/138; 382/139; 382/232; 382/194; 705/45; 235/380
(58) Field of Search ................................ 705/75, 45, 1; 713/176; 382/137, 198, 138, 187, 194, 192, 115, 232, 321; 235/375, 380

(56) References Cited

U.S. PATENT DOCUMENTS

| | | | | |
|---|---|---|---|---|
| 4,588,211 A | * | 5/1986 | Greene | 283/70 |
| 4,933,536 A | | 6/1990 | Lindemann et al. | 235/375 |
| 5,053,607 A | | 10/1991 | Carlson et al. | 235/379 |
| 5,175,382 A | * | 12/1992 | Hebgen et al. | 570/221 |
| 5,175,682 A | | 12/1992 | Higashiyama et al. | 364/408 |
| 5,444,794 A | * | 8/1995 | Uhland, Sr. | 705/45 |
| 5,832,464 A | | 11/1998 | Honvener et al. | 705/45 |
| 5,838,814 A | | 11/1998 | Moore | 382/735 |
| 5,865,547 A | | 2/1999 | Harris | 400/578 |
| 5,875,435 A | * | 2/1999 | Brown | 705/30 |
| 5,898,157 A | | 4/1999 | Mangili et al. | 235/380 |
| 6,020,954 A | * | 2/2000 | Aggarwal | 356/30 |
| 6,032,137 A | | 2/2000 | Ballard | 705/75 |
| 6,047,093 A | * | 4/2000 | Lopresti et al. | 382/310 |
| 6,155,604 A | * | 12/2000 | Greene et al. | 283/70 |
| 2003/0046237 A1 | * | 3/2003 | Uberti | 705/44 |

OTHER PUBLICATIONS ach history, published at http://www.paymensystems.org/achhist.htm on Jun. 6, 2001.

* cited by examiner

Primary Examiner—Bhavesh M. Mehta
Assistant Examiner—Barry ChooBin
(74) Attorney, Agent, or Firm—Jeanine S. Ray-Yarletts; Ronald V. Davidge

(57) ABSTRACT

A point of sale terminal includes an input device, for reading information to be stored as part of a financial transaction, and a storage device in which data derived from the information is stored, with the amount of data stored being determined by the financial value of the transaction. The terminal may include a document scanner providing an image of a check or of another form of identification associated with a check, and a digitizing tablet, which provides an indication of movement of a pen or stylus to form a signature. The terminal may also include optical character recognition, which is used to obtain a name and address from the check, which is also stored according to the value of the check.

24 Claims, 3 Drawing Sheets

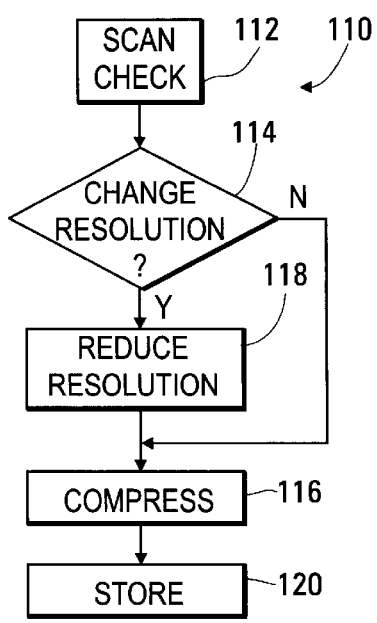
FIG. 3
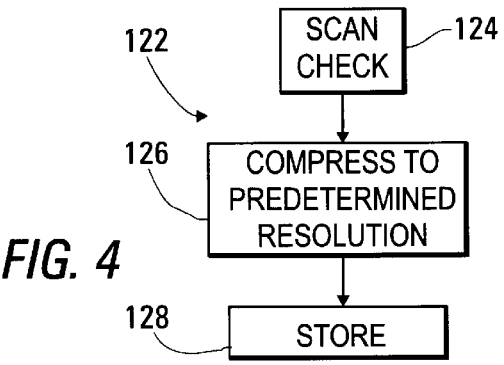
FIG. 4
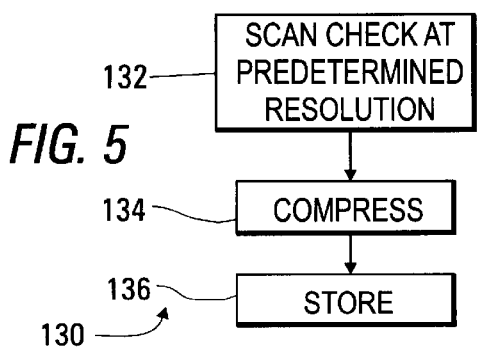
FIG. 5
FIG. 6
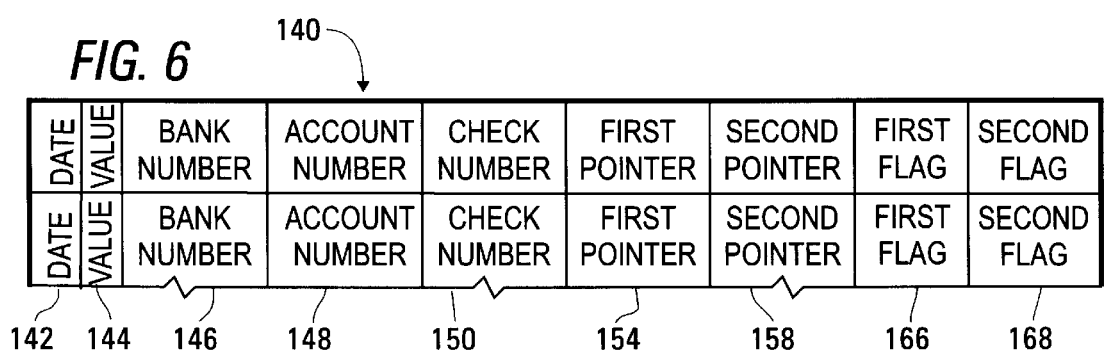
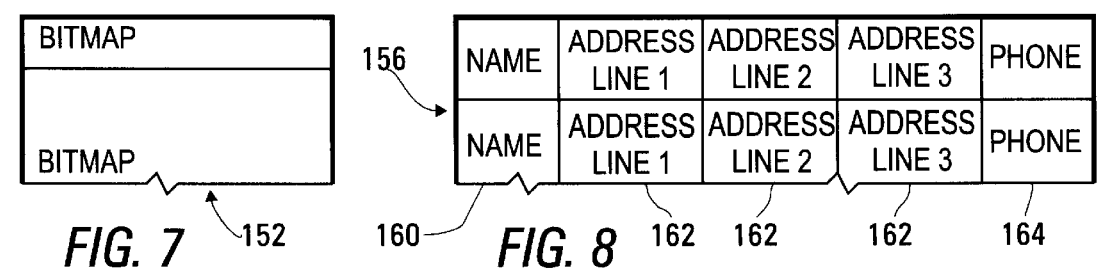
FIG. 7
FIG. 8

STORING INFORMATION RECORDED AS PART OF A FINANCIAL TRANSACTION WITH A QUANTITY OF DATA STORED DETERMINED BY A MONETARY VALUE OF THE TRANSACTION

BACKGROUND INFORMATION

1. Field of Invention

This invention relates to storing information recorded as part of a financial transaction, and, more particularly, to storing data representing an image of a check or an image of a form of identification, such as a signature, a photograph, or a fingerprint, in an efficient manner.

2. Background Information

A number of banking interests have been pursuing a nationwide paperless transaction system in response to increases in the volume of checks handled and further in response to increases in the average cost of handling individual checks. In the early 1970's a group of California bankers formed the Special Committee on Paperless Entries (SCOPE) to explore the technical, operational, and legal framework needed for an automated payments system. In addition, in 1972, the first Automated Clearing House (ACH) association began operation, with the National Automated Clearing House Association (NACHA) being formed in 1974 to coordinate the ACH organizations being formed in various regions. Now, a nationwide ACH system makes paperless transaction exchanges available to all depository financial institutions, with benefits resulting from cost reductions and improved productivity, compared to conventional paper check transactions.

Currently, a number of efforts are being made to extend the application of paperless transactions with banks to a number of merchants. For example, in a conventional credit card transaction, an electronic transfer of funds results from a telephone transmission from the merchant to an agency handling credit card transactions, with the signed credit card slip being retained by the merchant for his records, and to be used, if necessary, to obtain subsequent payment or prosecute if such payment is refused. A further step, which is currently being implemented, is the electronic storage of the customer's signature, together with transaction data, so that the merchant no longer needs to retain the signed credit card slip. This is now accomplished by having the customer sign the credit card slip on a small digitizing, or graphics, tablet having associated electronics to generate signals representing the position of the pen tip as he signs the slip. These signals are used to generate graphical data representing the signature, which is stored by the merchant as proof that the customer in fact signed the slip.

A number of patents describe methods for processing checks by means of electronic funds transfer in real time, at the time the check is offered for payment, without requiring submission of the paper check itself into the banking system. For example, U.S. Pat. No. 5,832,464 describes a system and method providing an ability to use a check as a form of payment at a point of use without having to use the signed check as the binding document that is processed through the financial system to obtain payment by the entity rendering the service. The system and method comprises reading a hardcopy check via an electronic scanner, correlating the account number to a biometric or other piece of data that would positively identify the person tendering the check and using the biometric, such as a digital photograph of each authorized user, or other data, such as information from a driver's license, to confirm the identity of the person tendering the check. This data is then associated with an available record of the person who performed the biometric or other data comparison. Once a particular financial transaction is authorized, the check is returned to the tenderer and the financial transaction is processed as an electronic fund transfer (EFT).

U.S. Pat. No. 5,053,607 further describes a point of sale device for real-time check processing, with the financial transaction associated with a sale being completed while the merchant and customer are still face-to-face. The device uses means for reading the magnetic ink information extending along the lower edge of a check, a printer, and a keypad to feed information into a computing system, which communicates through an existing telecommunications system with the customer's bank and with the merchant's bank to transfer funds from the customer's account to the merchant's account.

U.S. Pat. No. 5,175,682 describes a method and structure provided for processing checks in a timely and cost-effective manner. A check recipient, such as a merchant, utility billing department, and the like, utilize hardware and software for quickly gathering data from checks received in order to allow prompt processing of those checks. Such hardware preferably includes a reader for reading the MICR account information printed on the check, and means for associating that data with information pertaining to the transaction at hand, including for example, the dollar amount of the transaction. This information is combined in a data record, which is stored for future batch data transmission to a clearinghouse or the issuing bank itself. In an alternative embodiment, this data is communicated in real time to the clearinghouse or issuing bank. In another embodiment, one or more selection criteria are used to determine which checks will be processed in real time, with the remaining checks being processed in the batch mode. For example, checks written above a threshold dollar amount, out of state checks, or any other high-risk checks are processed in real time in order to minimize losses due to fraudulent check use.

While these prior-art methods provide for processing check-based financial transactions without the need for processing paper checks through the financial infrastructure, the quantity of data that must be captured, stored, and transmitted is very large. Furthermore, the methods require data transmission in real time, when the check is presented, which may often be inconvenient, expensive due to the telephone connections which must be maintained, or even impossible. Therefore, what is needed is a method for efficiently storing data associated with financial transactions for later transmission or processing. If real-time check processing is to be avoided as often impractical, even for high-monetary value checks, security may be achieved by processing high-monetary value checks in a manner maximizing the likelihood that an arrest and prosecution can be expected in the event that a check given for a sale is not subsequently honored, either upon its presentation to a banking institution, or upon following attempts to collect funds. However, while successful prosecution depends on the presentation of clear and accurate evidence, conventional methods for storing the images of checks are potentially inadequate for determining whether a signature is genuine or a forgery. Yet, any practical system for storing check images must also be capable of storing thousands of images, including the images of many checks too small to suggest prosecution if they are dishonored. Thus, what is needed is a practical method for storing vast amounts of data to cover relatively small transactions and for storing accurate, detailed images to cover relatively large transactions.

U.S. Pat. No. 6,032,137 describes a system comprehensively supporting the processing of documents and electronic data associated with different applications, including sales, business, banking, and general consumer transactions. The system retrieves transaction data such as credit card receipts, checks in either electronic or paper form at one or more remote locations, encrypts the data, transmits the encrypted data to a central location, transforms the data to a usable form, performs verification using signature data and biometric data, generates informative reports from the data, and transmits the informative reports to the remote location (s). However, again, what is needed is a practical method for storing vast amounts of data to cover relatively small transactions and for storing accurate, detailed images to cover relatively large transactions.

A number of other patents describe methods to scan and recognize particular forms of data from a check, so that the data can be stored or used for processing. For example, U.S. Pat. No. 4,933,536 describes a check processing device incorporated in a point of sale terminal, including a xerographic copier to reproduce an image of personal identification onto the back of a check, an electronic stamping mechanism for imprinting a transaction date, time and number on the back of the check, and a scanner, which reads and stores a customer's checking account number and controls a cash register according to the validity and presence of the check and the presence of personal identification.

U.S. Pat. No. 5,898,157 describes a device for automatically reading checks, wherein a scanner includes a reading unit for reading an identification code on the check, and a reading unit for taking an image of the surface of the check, and the device also includes a central processing unit receiving the digitized image of the check, and for defining an image, on the basis of the identification code, at least two subimages respectively containing the numeric amount and the alphabetic amount of the check, U.S. Pat. No. 5,838,814 describes a check permitting confirmation that a check was drawn by an authorized maker at the time of transaction. The check includes a picture of the authorized maker and an electronically scannable means for informing the bank whether the check was transacted with the authorized maker present. The picture may include stenganographic identification coding, such as an encoded bank mark which can be electronically read and correlated, but which is not reproduced by a photostatic process. Confirmation of endorsement by the person or entity to whom the draft is drawn is effectuated by providing for a plurality of unique codes associated with the identity of an endorser. Such unique codes preferably include a "made payable to code" and an "endorsement code". Preferably the invention of U.S. Pat. No. 5,838,814 provides for means for the drawee of the draft to confirm that sufficient funds are available in the account upon which the draft is drawn. Such means may include incorporation onto the draft itself of electronically readable information correlatable with the account from which the draft is drawn.

While the data derived by such methods from checks may be used in a number of ways, in many applications, thousands of checks are process daily, potentially causing the generation of too much data to handle reasonably. What is needed is a method for determining which checks can be expected to provide useful data, and for limiting the collection of such data to the processing of those checks.

SUMMARY OF THE INVENTION

Accordingly, it is a first objective of the invention to provide a method for storing information recorded as part of a financial transaction in a manner in which the amount of information stored is determined by the monetary value of the financial transaction.

It is another objective of the invention to provide a method for storing a graphical representation of such a document at a resolution determined by the monetary value of a financial transaction associated with the document.

It is another objective of the invention to provide a method for determining whether to store optically recognized text data from such a document based on the monetary value of the financial transaction.

In accordance with a first aspect of the invention, a method is provided for storing information recorded as part of a financial transaction. The method includes:

a) determining a monetary value of the financial transaction;

b) generating computer readable signals representing the information;

c) determining a quantity of data to represent the computer readable signals, wherein the quantity of data is decreased when the monetary value of the financial transaction is lower than a threshold monetary value; and d) storing data representing the quantity of data.

The process of determining a monetary value of the financial transaction includes adding the prices of items being purchased, with inputs being provided through a keypad and/or a barcode scanner. This process may also reflect a desire on the part of the customer to receive cash back or to use the transaction document to pay for only part of the purchases. If a check is presented to pay for the transaction, the check is scanned, with the quantity of data being a number of pixels, and/or text generated by optical character recognition. If a credit card is presented for payment, a signature is recorded on a digitizing tablet, and the quantity of data is a number of bits used to describe the movement of an instrument, such as a pen or stylus, used in the signature process.

In accordance with a second aspect of the invention, a system is provided for processing a financial transaction. The system includes a storage device, first and second input means, and a processor. The first input means is for processing purchases associated with the financial transaction. The second input means is for generating computer readable signals representing information to be recorded as part of the financial transaction. The processor is programmed to determine a monetary value of the financial transaction in response to inputs from the first input means, to determine a quantity of data to represent the computer readable signals from the second input means, with the quantity of data being decreased when the monetary value of the financial transaction is lower than a first threshold monetary value, and to store data in the storage device representing the quantity of data.

The first input means, used to process purchases associated with the financial transaction, include, for example, a keypad and a barcode scanner used in a conventional way to determine the prices of items being purchased in transactions associated with the document.

In accordance with a third aspect of the invention, a computer readable medium is provided. Data representing each check within a plurality of checks is stored on the computer readable medium. The data is stored within first and second data structures. The second data structure contains a bitmap representing a number of pixels derived from an image of each check within the plurality of checks. The number of pixels is determined according to a monetary value of the check for each check within the plurality of checks. The first data structure includes some or all of the following: a first field containing data representing a transaction date for each check within a plurality of checks, a second field containing data representing the monetary value of each check within the plurality of checks, a third field containing data representing an account number for each check within the plurality of checks, a fourth field containing data representing a check number for each check within the plurality of checks, and a fifth field containing data representing a pointer to a bitmap stored within the second data structure for each check within the plurality of checks.

BRIEF DESCRIPTION OF THE FIGURES

FIG. 3 is a flow chart of processes occurring during a first version of the invention during steps within the processes of FIG. 2 in which a check is scanned, with data being recorded;

FIG. 4 is a flow chart of processes occurring during a second version of the invention during steps within the processes of FIG. 2 in which a check is scanned, with data being recorded;

FIG. 5 is a flow chart of processes occurring during a third version of the invention during steps within the processes of FIG. 2 in which a check is scanned, with data being recorded;

FIG. 6 is a fragmentary pictographic view of a first data structure storing check data in the apparatus of FIG. 1;

FIG. 7 is a fragmentary pictographic view of a second data structure storing check data in the apparatus of FIG. 1; and FIG. 8 is a fragmentary pictographic view of a third data structure storing check data in the apparatus of FIG. 1.

DETAILED DESCRIPTION OF THE INVENTION

Figure 1:
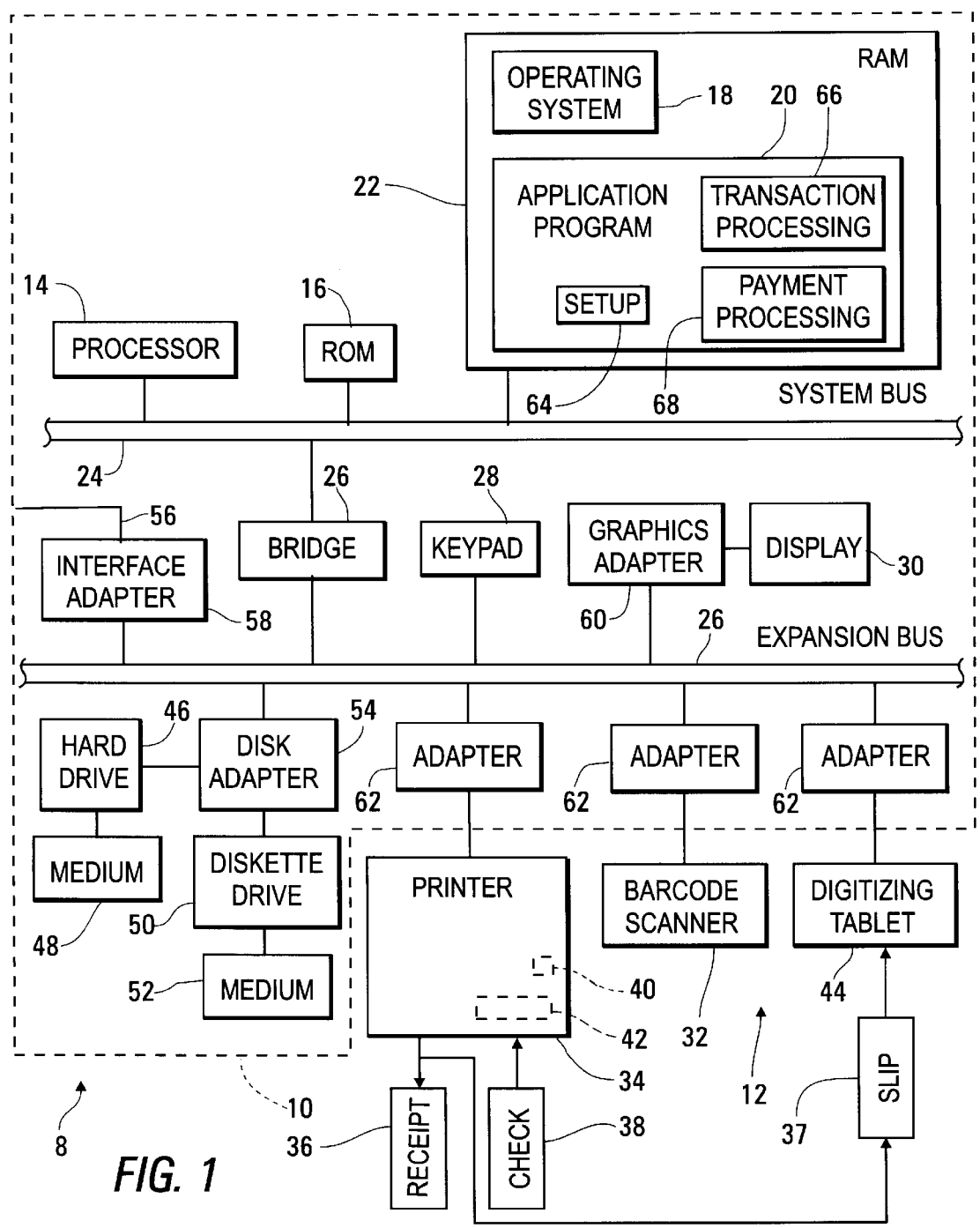
FIG. 1 is a block diagram of a point of sale terminal configured for operation in accordance with the present invention.

FIG. 1 is a block diagram of a point of sale terminal, generally indicated as 8, configured for operation in accordance with the present invention, including a computing system 10 and a number of peripheral devices 12. The point of sale terminal is particularly configured for operation by a cashier in an environment in which the sale prices of items being purchased are totaled, and in which checks and credit cards are accepted as payment for such items. Thus, the point of sale terminal 8 may operate as a single such terminal within a store or as one of a number of such terminals.

The computing system 10 includes a microprocessor 14 executing instructions from an initialization or BIOS (basic input/output system) program stored in ROM 16 (read only memory) and from an operating system 18 and an application program 20 stored in RAM 22 (random access memory). These memory devices 16, 22 are connected with the microprocessor 14 by means of a system bus 24.

Various other devices are connected to the expansion bus 26, connected to the system bus 24 through a bridge circuit 28. The expansion bus 26 may represent several buses, including, for example, an ISA bus (industry standard architecture), and one or more PCI buses (peripheral component interconnect), with the multiple buses being interconnected by bridge circuits. The devices connected to the expansion bus 26 particularly include devices suited for system operation within a point of sale environment. Thus, a keypad 28 is configured for operation in the manner of an adding machine or cash register, and the display screen 30, while being generally smaller than a display screen used with a general-purpose personal computer, is adapted to the display of information relating to a transaction to purchase a number of products.

Pricing information for products being purchased is determined from data entered by the cashier using the keypad 28 or a barcode scanner 32. The barcode scanner 32 may be a conventional type, being handheld for movement relative to a product being scanned, or presenting an upward-directed window, above which the product is moved. Information may be input into the computing system 10 in the form of a numeric identifier determined by reading, through the barcode scanner 32, the UPC (Uniform Product Code) information described by a conventional barcode on the product. Additionally, information may be provided as input through the keypad 28, either in the form of such a numeric identifier or in the form of an actual price.

The point of sale terminal 8 also includes a printer 34, which is preferably configured to print receipts 36, to print credit card slips 37, and to print information on checks 38. The printer 34 preferably includes an MICR (magnetic ink character recognition) reader 40 positioned to read the information printed in ferromagnetic indicia on a check 38 moving within the printer and to translate the information thus obtained into a format usable by computers and other devices. A printer having an MICR reader used in this manner is described in U.S. Pat. No. 5,865,547, the disclosure of which is incorporated herein by reference.

The point of sale terminal 8 also includes a document scanner 42 for converting an image on a document surface, such as the face of the check 38, into computer-readable electrical signals. Such a scanner is preferably mounted within the printer 34, as shown in FIG. 1, so that the image on the face of the check 38 is read as the check 38 is moved within the printer 34. Alternately, one of a number of document scanning devices, separate from the printer 34, may be used, with the check 38 being inserted into a separate scanner or place on top of a separate scanner. For example, the device of U.S. Pat. No. 5,898,157, the disclosure of which is incorporated herein by reference, could by used for this purpose.

Preferably, the point of sale terminal 8 further includes a small digitizing tablet 44 for capturing the strokes of a pen or stylus used to form a signature. This movement may occur as the customer signs a credit card slip on a surface of the digitizing tablet, with the credit card slip having been printed, for example, within the printer 34. Alternately, the customer may be asked to sign a screen surface of the digitizer, with his signature being displayed by means of a liquid crystal display extending under the screen surface. In either case, the digitizing tablet 44 produces electrical signals that are interpreted as indications of pen movement during the signing process.

The computing system 10 also includes drive units for reading and writing computer readable media to provide nonvolatile data storage. A hard drive 46 operates with a hard drive medium 48, including a number of magnetic disks. A diskette drive 50 operates with a removable diskette medium 52. Both the hard drive 46 and the diskette drive 50 are connected to the expansion bus 26 through a disk adapter 54. A communications line 56 is connected to the expansion bus 26 through an interface adapter 58. If the communications line 56 is a telephone line, the interface adapter 58 is a modem. Alternately, the communications line 56 may form a portion of a LAN (local area network), with the interface adapter 58 being a LAN adapter. The display screen 30 is connected to the expansion bus 26 through a graphics adapter 60. The communications line 56 may be used, for example, to obtain specific pricing information for products identified by means of the barcode scanner 32. Otherwise, such pricing information may be obtained from a database stored within the computing system 10.

Other devices are connected to the expansion bus 26 through various adapters 62, which are specific to the particular types of devices being connected. Each of the adapters 58, 60, 62 provides for a conversion of signals between the forms required for the expansion bus 26 and the signal line or device to which it is attached.

The microprocessor executes instructions of an operating system 18 and of an application program 20 from RAM 22. The operating system 18 performs operations at a basic level, linking the application program 20 with the processes required to run the computer system 10. In accordance with the present invention, the application program 20 performs functions required in the process of purchasing or "checking-out" items at the point of sale terminal 8, together with particular process steps providing for the efficient storage of information taken from transaction documents.

The application program 20 includes a setup routine 64, a transaction processing routine 66, and a payment processing routine 68. The setup routine 64 includes steps necessary to install the program 20 for execution and a subroutine allowing various parameters to be set by the system user. The transaction processing routine 66 handles purchasing transactions, including the generation of price totals for each customer, and the processing of checks and credit cards. The payment processing routine 68 provides data to a financial institution so that the merchant will receive proper financial returns for payments that have been made with checks and credit cards.

While the application program 20 is shown in FIG. 1 as being stored within RAM 22 for execution, it is understood that the application program 20 is additionally stored in nonvolatile computer-readable storage on the hard drive medium 48, so that it is available for loading into the RAM 22, and that at least a portion of the application program 20 may remain in storage on the hard drive medium 48 at all times without being simultaneously loaded into RAM 22. It is furthermore understood that the application program 20 may be stored on the removable computer-readable medium 52 for introduction into the computing system 10.

Figure 2:
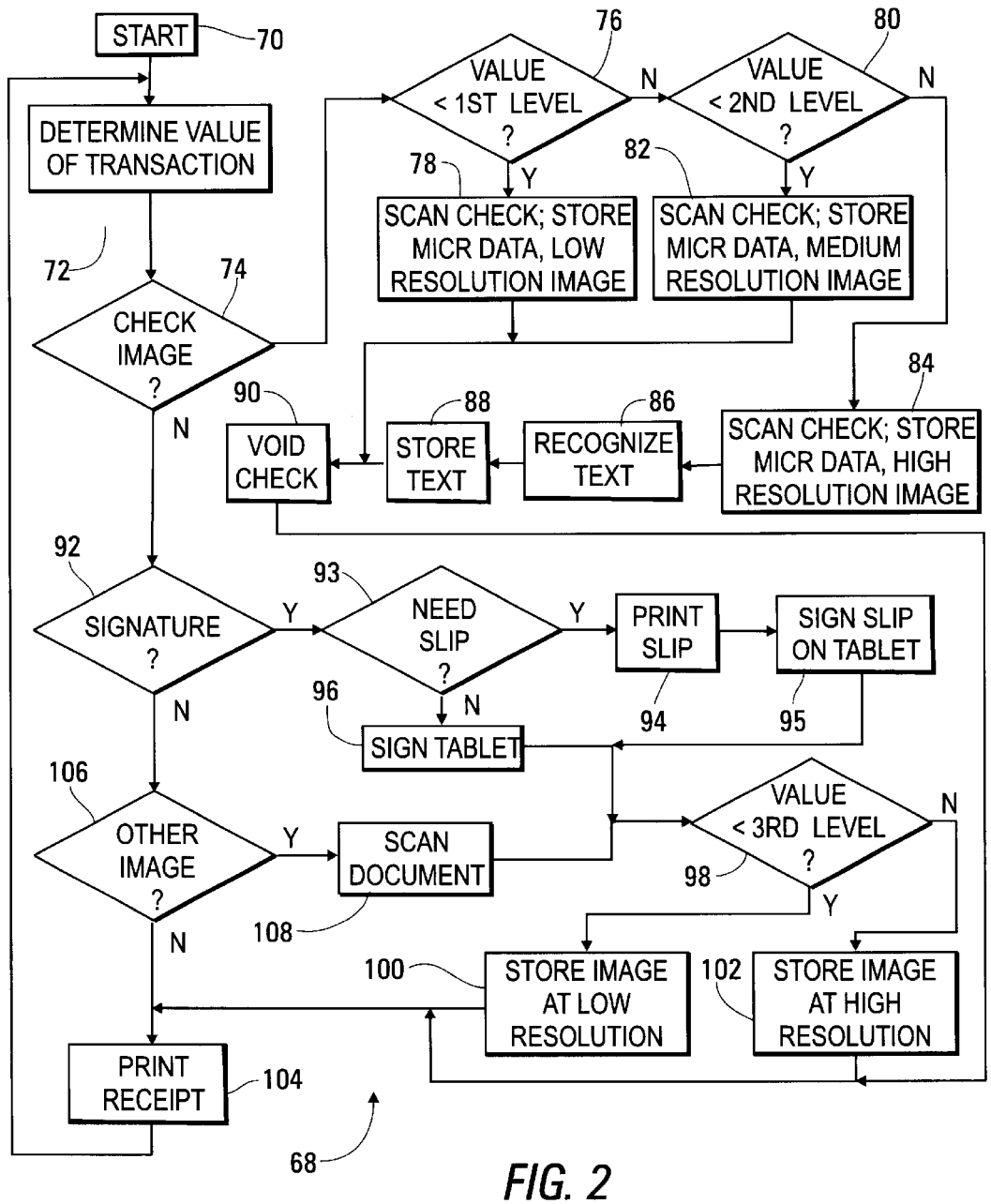
FIG. 2 is a flow chart of processes occurring within the point of sale terminal of FIG. 1 during execution of an application program therein in accordance with the present invention.

FIG. 2 is a flow chart of processes occurring within the point of sale terminal 8 under control of the transaction processing routine 66 of the application program 20, executing therein in accordance with the present invention. After this routine 66 is started in step 70, the monetary value of a financial transaction to be used is determined in step 72. The processes occurring during step 70 are the processes associated with the typical use of a modern point of sale terminal during the purchase of items by a customer. These processes include determining the price of each item being purchased, with the barcode on an item being scanned by the barcode scanner 32 to determine the UPC associated with the item, and with the actual price being determined by searching a database for the UPC. This database may be stored within the computing system 10, or it may be stored in another computing system connected to the computing system 10 through the communications line 56. Alternately, the price of an individual item may be entered by the cashier using the keypad 28, having read a price tag or other pricing information associated with the item. Step 72 also includes performing a number of conventional arithmetic operations, such as multiplying prices by quantities of items, adding prices to obtain a total, and applying sales taxes.

In the context of this description, the monetary value of the financial transaction is the monetary value listed on the check or charged to the credit card to pay for the financial transaction. Thus, the monetary value of the financial transaction is greater than the total derived from the items purchased if the customer asks for cash back or less than this total if the check or credit card is used to pay for only part of the purchases. In either case, the capabilities of the computing system 10 to perform arithmetic operations are used to determine the monetary value of the financial transaction, completing the processes of step 72.

The system next proceeds to step 74, in which a determination is made of whether a check, signed by the customer is offered for payment. This information may be provided by the cashier through the keypad 28. If a check is offered, the monetary value of the check is compared to one or more levels that have been established by the system user during the setup routine 64. Thus, if the document is a check, the system goes to step 76, in which a determination is made of whether the monetary value of the financial transaction (i.e., the monetary value of the check) is less than a first level. If the financial transaction monetary value is less than the first level, in step 78, the check is scanned within the scanner 42, with data being stored at a low resolution, for example in the hard drive medium 48. If the financial transaction monetary value is greater than or equal to the first level, a determination is made in step 80 of whether the financial transaction level is less than a second level. If it is, in step 82, the check is scanned within the scanner 42, with data being stored at a medium resolution, again for example in the hard drive medium 48. If the financial transaction monetary value is greater than the second monetary value, the document is scanned within the scanner 42, with data being stored at a high resolution in step 84, again for example in the hard drive medium 48. In steps 78, 82, and 84, the data is stored as a bitmap, i.e. within a data structure representing information in the form of a collection of individual bits, with the number of bits, and therefore the number of pixels represented by the bits, increasing with an increased level of resolution.

The motion of the check 38 past the scanner 42 preferably also moves the check 38 past the MICR reader 40, so that ferromagnetic indicia printed on the check 38 are read during the scanning process. Reading these indicia typically provides information describing the bank on which the check is drawn, the number of the account on which the check is drawn, and the number of the check 38 itself. When this data is subsequently presented to a banking institution, together with the monetary value of the check, an electronic funds transfer can be arranged to pay the merchant from the account on which the check was written. Thus, in each step 78, 82, 84, MICR data, including the bank number, the account number, and the check number, together with the monetary value of the check is stored as text data, for example on the hard drive medium 48.

The actual processes of scanning the check and storing the data at various levels of resolution can be accomplished in several ways, which will be discussed in reference to FIGS. 3–5.

Since a large number of checks may be handled in this manner, storing the images of only those checks having a relatively high monetary value at the highest resolution saves substantial space in the storage medium 48. If necessary, this resolution is sufficient to provide the kind of evidence needed in a legal proceeding. On the other hand, the images of checks having relatively low monetary values, which would probably never be used as evidence in a legal proceeding, are stored at the lowest resolution. In the example of FIG. 2, two levels of comparison are used to determine three levels of resolution at which documents are stored. Preferably, the number of levels of comparison, as well as the currency monetary value of each level, is set by the system user during execution of the setup routine 64.

The change in recorded image resolution made according to the monetary value of the check may be made by varying the image resolution produced by the scanner 42, gaining advantages in terms of scanner throughput. Alternately, the resolution of the image may be changed by processing within the computing system 10 between scanning and storage, with the scanner always operating at a sufficient resolution to provide for the high-resolution images of step 84, gaining an advantage in terms of similar operation of the scanner 42 for all checks. Methods for varying the resolution of document scanning and for changing the resolution of a previously-scanned resolution are well known to those skilled in the art of processing such images.

The data available on checks of relatively large monetary value may also be valuable for use in advertising and promotional programs. For example, the merchant may want to direct mail advertising or special promotions to individuals cashing large checks. Thus, in step 86, a portion of the text on checks over a predetermined level, such as the second level of step 80 in the example of FIG. 2, is recognized using optical character recognition. Preferably, such data includes the name, address, and telephone number of the person offering the check, since such information can subsequently be used to contact the person with advertising or promotional information. Then, in step 88, data resulting from this optical character recognition process is stored as text, for example in the hard drive medium 48.

In each of the steps 78, 82, and 84, in which a check offered for payment is scanned, the MICR reader 40 reads the ferromagnetic indicia printed in along a lower edge of the check. These indicia provide an identification of the bank on which the check is drawn, the customer's account number, and the number of the particular check. The monetary value of the check, which has been developed as described above during step 72, is used, together with this data, to develop a check payment data structure stored within the hard drive medium 48 along with a corresponding check image data structure developed from data generated within the optical scanner 42.

During subsequent execution of the payment processing routine 68 of the application program 20, this check payment data is separated from the check image data structure. Data from the check payment data structure is sent to a financial institution for payment, while data from the check image data structure is held for potential use if one or more of the checks offered for payment is/are refused for payment by a financial institution. Thus, a significant advantage of the present invention arises from the fact that an efficient method for storing check image data makes such batch processing of payment data more practical.

Since payment is made by such an electronic transfer of funds, the check itself is not presented to the bank. Preferably, the check is marked void in step 90, by printing within the printer 34, or by stamping. The check is then returned to the customer, providing him with a record to compare with subsequent action by his bank.

If a determination is made in step 74 that a check has not been offered for payment, a subsequent determination is made in step 92 of whether payment is to be made with a credit card. If it is to be made by a credit card, a determination is made in step 93 of whether a credit card slip will be needed. This decision reflects whether the store wants the customer to sign a credit card slip or just to sign, with a stylus, a space provided on surface of the digitizer tablet. Preferably, this choice is set by the system user during execution of the setup routine 64.

If it is determined that a credit card slip is needed in step 93, the credit card data and the amount are printed in step 94 on a credit card slip 37 in the printer 34. Alternately, step 94 may include forming an impression of the credit card. Then, in step 95, the customer signs the credit card slip 37 on the surface of the digitizing tablet 44, which provides output signals representing the movement of the pen or stylus during the signature process. Preferably, the digitizing tablet 44 is provided with a guide plate, extending above the surface on which the credit card slip 37 is signed, with the slip 37 being inserted under the guide plate, and with the credit cares slip 37 being signed through an aperture in the guide plate.

On the other hand, if it is determined in step 93 that a credit card slip is not needed, the customer signs an area provided on a screen of the digitizer tablet for this purpose, using a stylus in step 96. This process causes his signature to be filled in on the screen, which incorporates a liquid crystal display, as he completes his signature.

Like the scanned image of a check, the image of a signature taken from the digitizing table 44 may be stored at various levels of resolution. Also, the image of a signature in a transaction involving a large amount is more likely to be wanted or needed as legal evidence at a later time that such an image on a slip for a small amount. Therefore, like the scanned image of a check, the image of a credit card signature is stored at more than one resolution, with the level of resolution depending on the monetary value of the financial transaction. In the example of FIG. 2, a determination of whether the monetary value charged to the credit card slip is less than a third level is made in step 98. If it is less than this level, the image is stored at a low resolution in step 100; otherwise, the image is stored at a high resolution in step 102. In either case, the signature image is stored, for example, on the hard drive medium 48.

After a check is voided in step 90, and also after an image of a credit card signature is stored in step 100 or 102, the system proceeds to step 104, in which a receipt 36 of the transaction is printed in the printer 34. After the receipt 36 is printed, the system returns to step 72 to wait for the next customer with a transaction.

If a determination is made in step 92 that the information to be stored as part of the transaction is not a signature to be recorded on the digitizing tablet 44, a determination is made in step 106 if an image of another type of document is to be stored as part of the transaction. If it is, then the document, which may be a form of identification, such as a driver's license, a finger print, or a photograph, is scanned within the document scanner 42, or other scanning means, in step 108. Then, the system proceeds to step 98 for a determination of whether the value of the financial transaction is less than the third level. If it is, the image is stored at the low resolution in step 100. Otherwise, it is stored at the high resolution in step 102. Then the receipt is printed in step 104.

If the transaction document is neither a check nor a credit card, as determined in steps 74 and 92, it must be a debit card or cash, so, if another type of identification is not needed, as determined in step 106, the system also proceeds to step 104. With conventional use of a debit card, there is nothing for the customer to sign, and thus no image to be recorded; his knowledge of a PIN number is used to verify his authorization to use the card. The process of obtaining payment for the use of a debit card is carried out in a conventional manner.

While FIG. 2 shown only a single threshold level, the third such level, being used in step 98 to determine the resolution at which a signature image or the image of an identification document is stored, it is understood that several different levels can be used to choose among several levels of resolution at which such images are stored.

The communications line 56 may be used to establish communication with a financial institution to arrange for payments through electronic funds transfer. The images of checks and credit card signatures may be stored on the hard drive medium 48 as described above, or may be transferred through the communications line 56 to another storage medium, accessed through another computing system.

FIGS. 3–5 are flow charts of processes occurring during different versions of steps 78, 82, and 84, in which the check 38 is scanned within the scanner 42, and in which the image data is stored at a low, medium, or high resolution on the hard drive medium 48. The resolution of the image data may be considered as a total number of pixels or as a number of pixels extending in a horizontal direction by a number of pixels extending in a vertical direction. Alternately, the resolution may be considered in terms of pixels per inch of distance along the check being imaged. Checks vary in size, being typically 7 cm by 15 cm, or 7.5 cm by 21 cm. The total number of pixels may be greater for the larger size check. In the present invention, the images may be color, black and white (with all pixels either black or white) or gray scale (with variations in pixel darkness), but it is believed that black and white or gray-scale images, being sufficient for the described purposes, save substantial amounts of storage.

Referring first to FIG. 3, in a first version 110 of the processes occurring during steps 78, 82, and 84, the check is first scanned, in step 112, at a high resolution level used for checks having relatively high monetary values. Next, in step 114, a determination is made of whether the resolution is to be changed. If the monetary value of the check is not less than the second level monetary value, as determined in steps 76 and 80, the resolution is not changed, so the system proceeds to step 116, in which the image data is compressed by an image data compression technique to further reduce the space required for storage. If the monetary value of the check is less than the second level monetary value, as determined in step 76 or in step 80, the resolution of the image is reduced in step 118 before proceeding to step 116. The resolution can be changed in a number of ways, such as averaging the values of four adjacent pixels in a rectangular pattern, eliminating three of the pixels, and giving the average value to the remaining pixel. After compression, the image data is stored in step 120. Thus, in the method of FIG. 3, the amount of data handled by the image data compression technique in step 116 is reduced by the reduction of resolution in step 118.

An example of an image data compression technique used for compression of this type of image data, which is well known to those skilled in the art of computer imaging, is that developed by JPEG, the Joint Photographic Experts Group. This routine produces images conventionally stored as files having a .JPG extension. The compression technique may additionally reduce the resolution. For example, JPEG processing typically averages two horizontally adjacent pixels, replacing them with a single pixel.

Referring to FIG. 4, in a second version 122 of the processes occurring during steps 78, 82, and 84, the check is similarly scanned, in step 124, at a high resolution. Then, the image data is compressed in step 126, with a resolution decreasing algorithm used within the compression process being varied according to the monetary value of the check, as determined in steps 76, 80. Then, the compressed image data is stored in step 128.

Referring to FIG. 5, in a third version 130 of the processes occurring during steps 78, 82, and 84, the check is scanned at a resolution determined according to the monetary value of the check, again as previously determined in steps 78, 82, and 84. Then, the image data is compressed in step 132 and stored in step 136.

FIG. 6 is a fragmentary pictographic view of a first data structure 140 storing check data in accordance with the present invention. One entry is made for each check processed. The first data structure 140 includes a first field 142, in which data representing the date of the transaction is recorded, and a second field 144, in which data representing the monetary value of the check is recorded. Thus, the data in the first field 142 and in the second field 144 is available within the computing system 10 as the check transaction is processed. The first data structure 140 also includes a third field 146, in which data is recorded describing the bank on which the check is drawn, a fourth field 148, in which data is recorded describing the account on which the check is drawn, and a fifth field 150, in which data is recorded identifying the number of the individual check. Thus the data in the third, fourth, and fifth fields 146, 148, 150 is determined by reading the ferromagnetic indicia on the check with the MICR reader 40 (shown in FIG. 1).

FIG. 7 is a fragmentary pictographic view of a second data structure 152 storing check image data in the form of bitmaps in accordance with the present invention. This data includes different numbers of bits, describing different numbers of pixels, for the various check entries. The first data structure 140 includes a sixth field 154, in which a pointer to the corresponding bitmap in the second data structure 152 is stored.

FIG. 8 is a fragmentary pictographic view of a third data structure 156 storing customer name and address data in accordance with the present invention, for those checks not having monetary values less than the second transaction value, as determined in step 80 (shown in FIG. 2). The first data structure 140 includes a seventh field 158, in which a pointer to the corresponding entry in the third data structure 156 is stored. The third data structure 156 includes a first field 160, in which the name of the customer presenting the check is stored, three fields 162, in which up to three lines of the address of the customer are stored, and a fifth field, in which the telephone number of the customer is stored, if it is available. Thus, the data stored in the third data structure 156 is derived from optically recognizing a portion of the data printed on the check in step 86.

Referring again to FIG. 6, the first data structure 140 also includes an eighth field 166 and a ninth field 168, which together store information describing processes used in the collection of payments for the individual check of each entry. For example, a first flag bit, in the eighth field 166, is set when such payment is requested, while a second flag bit, in the ninth field 168, is set when such payment is received. Data in the first data structure 140, and also in the second data structure 152 may be deleted after payment has been received, or after a set time period following the receipt of payment.

The data structures 140, 152, 156 may be stored on the hard drive medium 48 of the computer system 10. Alternately, these data structures 140, 152, 156 may be stored in a file of another system (not shown), with data being transmitted along the communication line 56. Such storage in another system is used, for example, when a store has a number of point-of-sale terminals 8 communicating with a single computer system, which in turn communicates with a financial network.

Thus, in each of these versions of the present invention, the resolution is determined in accordance with the monetary value of the check. It may also depend on other factors, which are varied in conventional ways to optimize further the use of storage space. Thus, the resolution may also depend on the size of the check used as an original document and on the level of detail of the original image, which affects the operation of the compression algorithm. While the present invention has been described in its preferred forms or embodiments with some degree of particularity, it is understood that this description has been given only by way of example, and that numerous changes in the details of fabrication and use, including the combination and rearrangement of parts, may be made without departing from the spirit and scope of the invention.

What is claimed is:

1. A method for storing information recorded as part of a financial transaction, wherein said method comprises:
    a) determining a monetary value of said financial transaction;
    b) generating computer readable signals representing said information;
    c) determining a quantity of data to represent said computer readable signals, wherein said quantity of data is decreased when said monetary value of said financial transaction is lower than a threshold monetary value; and
    d) storing data representing said quantity of data.

2. The method of claim 1, wherein
    step b) occurs within a document scanner,
    said data representing said quantity of data is stored as a bitmap, and
    said quantity of data is a number of pixels representing said computer readable signals.

3. The method of claim 2, additionally comprising, before step d),
    e) reducing said quantity of data by an image data compression process.

4. The method of claim 3, wherein
    step c) occurs before step e), and
    step c) reduces a quantity of data processed within step e).

5. The method of claim 3, wherein
    step c) occurs before step e), and
    step e) includes performing a compression algorithm controlled in response to step c).

6. The method of claim 3, wherein
    step c) occurs before step b), and
    said computer readable signals are generated in accordance with step c).

7. The method of claim 1, wherein
    step b) occurs within a document scanner,
    said data representing said quantity of data is stored as text,
    said method additionally comprises performing optical character recognition in response to step c) to generate said data representing said quantity of data.

8. The method of claim 1, wherein
    step b) occurs within a digitizing tablet, and
    said quantity of data is a number of bits representing a path of movement of an instrument in forming a signature.

9. A method for processing a check, wherein said method comprises:
    a) determining a monetary value of said check;
    b) scanning said check to generate computer readable signals representing an image of said check;
    c) reading ferromagnetic indicia on said check;
    d) determining a number of pixels to represent said computer readable signals, wherein said number of pixels is decreased when said monetary value of said check is lower than a first threshold monetary value;
    e) storing data representing said quantity of data as a bitmap; and
    f) storing data representing said ferromagnetic indicia and said monetary value of said check.

10. The method of claim 9, additionally comprising, before step e),
    g) reducing said number of pixels by an image data compression process.

11. The method of claim 10, wherein
    step d) occurs before step e), and
    step d) reduces a quantity of data processed within step g).

12. The method of claim 10, wherein
    step d) occurs before step e), and
    step g) includes performing a compression algorithm controlled in response to step d).

13. The method of claim 10, wherein
    step d) occurs before step b), and
    said computer readable signals are generated in accordance with step d).

14. The method of claim 9, additionally comprising:
    h) performing optical character recognition of data printed on said check to determine customer address information; and
    i) storing said customer address information.

15. The method of claim 14, wherein
    said method additionally comprises:
    j) determining that said monetary value of said check is higher than a second threshold monetary value, and
    steps h) and i) are performed in response to step j).

16. A system for processing a financial transaction, wherein said system comprises:
    a storage device;
    first input means for processing purchases associated with said financial transaction;
    second input means for generating computer readable signals representing information to be recorded as part of said financial transaction; and
    a processor programmed to:
        determine a monetary value of said financial transaction in response to inputs from said first input means, determine a quantity of data to represent said computer readable signals from said second input means, wherein said quantity of data is decreased when said monetary value of said financial transaction is lower than a first threshold monetary value, and store data in said storage device representing said quantity of data.

17. The system of claim 16, wherein said first input means includes a document scanner, said data representing said quantity of data is stored as a bitmap, and said quantity of data includes a number of pixels representing said computer readable signals.

18. The system of claim 16, wherein said second input means includes a document scanner, said processor is additionally programmed to perform character recognition in response to potions of said computer readable signals from said document scanner, data representing a first portion of said quantity of data is stored as a bitmap, data representing a second portion of said quantity of data is stored as text, said first portion of said quantity of data includes a number of pixels representing said computer readable signals, and said second portion of said quantity of data includes text from said character recognition.

19. The system of claim 18, wherein said second input means additionally includes a digitizing tablet generating signals representing a pattern of movement of an instrument along a surface of said digitizing tablet, and said quantity of data is a number of bits representing said signals representing said pattern of movement.

20. A computer readable medium having stored thereon an application program, wherein said application program includes instructions for execution within a processor to cause said processor to perform steps of:

determining a monetary value of a financial transaction in response to processing transactions associated with said financial transaction, determining a quantity of data to represent computer readable signals representing information recorded as part of said financial transaction, wherein said quantity of data is decreased when said monetary value of said financial transaction is lower than a first threshold monetary value, and storing data representing said quantity of data in a storage device.

21. The computer readable medium of claim 20, wherein said data representing said quantity of data is stored as a bitmap, and said quantity of data includes a number of pixels representing said computer readable signals.

22. The computer readable medium of claim 20, wherein said application program additionally includes instructions for execution within said processor to cause said processor recognize characters in response to potions of said computer readable signals, data representing a first portion of said quantity of data is stored as a bitmap, data representing a second portion of said quantity of data is stored as text, said first portion of said quantity of data includes a number of pixels representing said computer readable signals, and said second portion of said quantity of data includes text from said character recognition.

23. A computer readable medium having stored thereon data representing each check within a plurality of checks, wherein said data is stored within first and second data structures, said second data structure contains a bitmap representing a number of pixels derived from an image of each check within said plurality of checks, said number of pixels is determined according to a monetary value of said check for each check within said plurality of checks, and said first data structure comprises:

a first field containing data representing a transaction date for each check within a plurality of checks, a second field containing data representing said monetary value of each check within said plurality of checks, a third field containing data representing an account number for each check within said plurality of checks, a fourth field containing data representing a check number for each check within said plurality of checks, and a fifth field containing data representing a pointer to a bitmap stored within said second data structure for each check within said plurality of checks.

24. The computer readable medium of claim 23, wherein said data is additionally stored within a third data structure including fields containing data representing a name, address, and telephone number from each check, having a monetary value exceeding a threshold value, within said plurality of checks, and said first data structure additionally includes a sixth field containing data representing a pointer to data stored within said third data structure for each check, having a monetary value exceeding a threshold value, within said plurality of checks.

* * * * *